United States Patent
Sakamoto et al.

(10) Patent No.: US 6,262,146 B1
(45) Date of Patent: Jul. 17, 2001

(54) ALIPHATIC HYDROCARBON
(54) bx;1GROUP-CONTAINING RESIN COMPOSITION FOR CATIONIC ELECTROCOATING AND CATIONIC ELECTROCOATING COMPOSITION (75) Inventors: Hiroyuki Sakamoto, Kobe; Saori Yoshimatsu, Toyonaka; Ichiro Kawakami, Takatsuki; Koji Izumiya, Toyonaka; Toshitaka Kawanami, Kawabe-gun; Takao Saito, Toyonaka, all of (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/358,839

(22) Filed: Jul. 22, 1999

(30) Foreign Application Priority Data

Jul. 2, 1998 (JP) .................................................. 10-206517

(51) Int. Cl.$^7$ ............................... C08K 3/20; C08L 63/02
(52) U.S. Cl. ............................ 523/404; 525/525; 525/530
(58) Field of Search .......................... 523/404; 525/525, 525/530

(56) References Cited

FOREIGN PATENT DOCUMENTS

709714 * 2/1998 (AU).

* cited by examiner

Primary Examiner—Robert Dawson
Assistant Examiner—D. Aylward
(74) Attorney, Agent, or Firm—Connolly, Bove, Lodge & Hutz, LLP.

(57) ABSTRACT

An aliphatic hydrocarbon group-containing resin composition for cationic electrocoating, which comprises a resin having a skeleton of epoxy resin and has a number average molecular weight of 500 to 20,000, and which contains, per 100 grams of the nonvolatile matter in said resin composition, (a) 5 to 400 millimoles of sulfonium group, (b) 80 to 355 millimoles of at least one aliphatic hydrocarbon group containing 8 to 24 carbon atoms and optionally containing unsaturated double bond within its chain, and (c) 10 to 315 millimoles of at least one member selected from among propargyl group and a terminal unsaturated double bond-containing organic group containing 3 to 7 carbon atoms; the total content of said (a), said (b) and said (c) being not more than 500 millimoles per 100 grams of the nonvolatile matter in said resin composition.

5 Claims, 1 Drawing Sheet

FIG. 1

ALIPHATIC HYDROCARBON GROUP-CONTAINING RESIN COMPOSITION FOR CATIONIC ELECTROCOATING AND CATIONIC ELECTROCOATING COMPOSITION

FIELD OF THE INVENTION

The present invention relates to a resin composition for cationic electrocoating and to a cationic electrocoating composition, each excellent in throwing power and capable of providing coatings excellent in impact resistance.

PRIOR ART

Cationic electrocoating can provide substrates or coating target articles with coatings every nook and cranny even when said substrates are complicated in form or shape and can be performed automatically and continuously. Therefore, it is in general use as a technique of forming an undercoat on substrates, such as automotive bodies, which have a large size and are complicated in form or shape and are required to be highly resistant to corrosion. Furthermore, said technique is very highly efficient from the coating composition consumption viewpoint, hence economical, as compared with other methods of coating and, therefore, it has come into wide use as an industrial method of coating.

Cationic electrocoating is carried out by immersing a substrate, which is to serve as a cathode, in a cationic electrocoating composition and applying a voltage. The deposition of a coating layer on the substrate involves electrochemical reaction and the coating layer that has deposited on the substrate surface upon voltage application has an insulating property. Therefore, with the progress of deposition of the coating in the process of coating, hence with the increase in deposit layer thickness, the electric resistance of the coating layer increases in proportion to the increase in layer thickness. As a result, the deposition of the coating composition at that site decreases and, instead, the deposition of a coating layer on some other uncoated site begins. In this way, the deposition of emulsion particles of the coating composition takes place successively from uncoated site to uncoated site. In the present specification, such successive formation of a coating on uncoated sites of a substrate is referred to as "throwing power".

Such cationic electrocoating is generally used in undercoat formation, mainly for the purpose of rust prevention and, therefore, it is required that even substrates having a complicated structure should be provided with a coating having a certain predetermined film thickness at any part thereof. For this reason, sufficient levels of throwing power are to be secured.

As a cationic electrocoating composition excellent in throwing power, WO 98/03701 for instance discloses a cationic electrocoating composition comprising a basic resin containing a triple bond such as an ethynyl or nitrile group within its molecule.

On the other hand, coating films to be formed on substrates such as automobiles should be protected from damages possibly resulting from collision with sand grains, small stones or the like during running. Thus, it is essential to make attempts to improve the so-called impact resistance. For attaining improved impact resistance, it is common practice to improve physical properties of the top coat and/or intermediate coat. However, it is not always possible to improve the impact resistance to a satisfactory extent by such a method alone. Coating film is generally constituted of a plurality of coating layers, so that it is necessary to improve the impact resistance of the film as a whole. In particular, if the impact resistance of the coating film as a whole can be improved through improvements in physical properties of an electrodeposition coating, there will arises the possibility that the impact resistance of the film might be markedly improved by combined use of some conventional impact resistance improving technology.

However, it is difficult to obtain a cationic electrocoating composition excellent in throwing power and capable of providing improved impact resistance using the conventional technology.

In view of the state of the art as mentioned above, the present invention has its object to provide a resin composition for cationic electrocoating and a cationic electrocoating composition, each excellent in throwing power and capable of providing coatings excellent in impact resistance.

SUMMARY OF THE INVENTION

The present invention provides an aliphatic hydrocarbon group-containing resin composition for cationic electrocoating, which comprises a resin having a skeleton of epoxy resin and has a number average molecular weight of 500 to 20,000, and which contains, per 100 grams of the nonvolatile matter in said resin composition, (a) 5 to 400 millimoles of sulfonium group;

(b) 80 to 355 millimoles of at least one aliphatic hydrocarbon group containing 8 to 24 carbon atoms and optionally containing unsaturated double bond within its chain; and (c) 10 to 315 millimoles of at least one-remember selected from among propargyl group and a terminal unsaturated double bond-containing organic group containing 3 to 7 carbon atoms;

the total content of (a) the sulfonium group, (b) the aliphatic hydrocarbon group containing 8 to 24 carbon atoms and optionally containing unsaturated double bond within its chain and (c) the at least one member selected from among propargyl group and a terminal unsaturated double bond-containing organic group containing 3 to 7 carbon atoms being not more than 500 millimoles per 100 grams of the nonvolatile matter in said resin composition.

The present invention also provides a cationic electrocoating composition which comprises the above resin composition for cationic electrocoating as incorporated therein, and in particular a cationic electrocoating composition which comprises the above resin composition for cationic electrocoating and further a resin composition having a skeleton of epoxy resin and containing sulfonium group and propargyl group, wherein said cationic electrocoating composition have a number average molecular weight of its resin component of 500 to 20,000 and contains, per 100 grams of the resin solids, (a) 5 to 400 millimoles of the sulfonium group;

(b) 10 to 300 millimoles of the aliphatic hydrocarbon group containing 8 to 24 carbon atoms and optionally containing unsaturated double bond within its chain; and 10 to 485 millimoles of the sum of propargyl group and the terminal unsaturated double bond-containing organic group containing 3 to 7 carbon atoms;

the total content of (a) the sulfonium group, (b) the aliphatic hydrocarbon group containing 8 to 24 carbon atoms and optionally containing unsaturated double bond within its chain, and the propargyl group and the terminal unsaturated double bond-containing organic group containing 3 to 7 carbon atoms being not more than 500 millimoles per 100 grams of the resin solids, with the proportion of said group (b) being 3 to 30% by weight relative to the resin solids.

BRIEF DESCRIPTION OF THE DRAWING

FIG. 1 is a schematic representation of an apparatus for throwing power measurement by so-called four-sheet box method. In the figure, the reference numeral 1 indicates sheets to be evaluated (the alphabetical letters indicating respective faces to be evaluated and the alphabetical letters in parentheses indicating the reverse sides), 2-counter electrode, 3-direct current, 4-through-hole, 5-electrodeposition bath, 6-stirrer, and 7-electrocoating composition.

DETAILED DESCRIPTION OF THE INVENTION

The resin composition for cationic electrocoating according to the present invention comprises a resin having a skeleton of epoxy resin. The skeleton-forming epoxy resin is not particularly restricted but can include, among others, epi-bis type epoxy resins, modifications thereof derived by chain extension with a diol, dicarboxylic acid or diamine or the like; epoxidized polybutadiene; novolak phenol type polyepoxy resins; novolak cresol type polyepoxy resins; poly(glycidyl acrylate); poly(glycidyl ether)s derived from aliphatic polyols or polyether polyols; and poly(glycidyl ester)s of polybasic carboxylic acids. Among these, novolak phenol type polyepoxy resins, novolak cresol type polyepoxy resins and poly(glycidyl acrylate) are preferred because of ease of polyfunctionalization for increasing curability. The epoxy resins may partly comprise a monoepoxy resin.

The resin composition for cationic electrocoating of the present invention, which comprises a resin having a skeleton of said epoxy resin, has a number average molecular weight of 500 to 20,000. If the number average molecular weight is less than 500, the cationic electrocoating efficiency will become low. When it is above 20,000, good coatings cannot be formed on substrate surfaces. A more preferred number average molecular weight range can be found according to the resin skeleton. In the case of novolak phenol type epoxy resins and novolak cresol type epoxy resins, for instance, 700 to 5,000 is a preferred range.

In the resin composition of the present invention, said resin having a skeleton of the epoxy resin contains:

(a) sulfonium group (hereinafter sometimes referred to as group (a) for short);

(b) an aliphatic hydrocarbon group which contains 8 to 24 carbon atoms and may optionally contain unsaturated double bond within its chain (hereinafter sometimes referred to as group (b) for short); and (c) at least one member selected from among propargyl group and a terminal unsaturated double bond-containing organic group containing 3 to 7 carbon atoms (hereinafter sometimes referred to as group (c) for short):

as introduced therein through epoxy groups of the skeleton-forming epoxy resin. In the present specification, the term "organic group" means a hydrocarbon group which may contain ester bond or ether bond. Said resin having a skeleton of epoxy resin may contain all species of the group (a), group (b) and group (c) in each molecule thereof, but this is not always necessary. Thus, for instance, one molecule may contain only one or two species of the group (a), group (b) and group (c). In the latter case, the resin molecules constituting the resin composition, as a whole, contain all species of the group (a), group (b) and group (c). Thus, the resin composition for cationic electrocoating may generally be composed of a plurality of resin molecules having a skeleton of epoxy resin and containing one, two or three or more species of the group (a), group (b) and group (c). In accordance with this meaning, the resin composition for cationic electrocoating of the invention contains the group (a), group (b) and group (c).

Therefore, a part of said skeleton-forming epoxy resin may have at least one epoxy resin per molecule. From the curability viewpoint, however, polyepoxy resins having at least two epoxy groups are preferred. As such, those polyepoxy resins specifically mentioned above can judiciously be used.

Said sulfonium group (a) is a hydratable functional group in the resin composition for cationic electrocoating. When applying a voltage or current at or above a certain level during the electrocoating process, the sulfonium group undergoes electrolytic reduction on an electrode, whereupon the ionic group disappears, so that it can irreversibly become nonconductor, as illustrated below. It can be considered that owing to this fact the resin composition for cationic electrocoating displays a high level of throwing power.

It can also be considered that, during this electrocoating process, electrode reaction is induced and the resulting hydroxide ion is kept by the sulfonium group, thus electrolytically generating a base in the electrodeposition coat. This electrolytically generated base can convert the propargyl group occurring in the electrodeposition coat, which has low thermal reactivity, to allene bond, which has high thermal reactivity.

The content of the sulfonium group (a) is 5 to 400 millimoles per 100 grams of the nonvolatile matter in the resin composition for cationic electrocoating according to the present invention, provided that the conditions concerning the total content of the group (a), group (b) and group (c) should be satisfied. If said content is lower than 5 millimoles per 100 grams, sufficient throwing power or curability can never be obtained and, furthermore, the hydratability and bath stability will be poor. When it is higher than 400 millimoles per 100 grams, the deposition of coatings on substrate surfaces becomes poor. A preferred content range can be specified according to the resin skeleton. In the case of novolak phenol type epoxy resins and novolak cresol type epoxy resins, for instance, a preferred range is 5 to 250 millimoles, more preferably 10 to 150 millimoles, per 100 grams of the nonvolatile matter in the resin composition.

The aliphatic hydrocarbon group (b) which contains 8 to 24 carbon atoms and may contain unsaturated double bond within its chain can form a soft segment in the resin and can improve the impact resistance.

The group (b) is not particularly restricted but can include straight, branched, cyclic or other hydrocarbon groups other than aromatic hydrocarbon groups, which may contain unsaturated double bond within its chain. Preferred are straight or branched hydrocarbon groups containing carbon-carbon double bond within its chain. Such groups can be derived from the corresponding aliphatic hydrocarbons containing such a group. Specific examples of compounds containing such an aliphatic hydrocarbon group will be mentioned later herein.

The group (b) is introduced into the resin via the oxygen atom derived from epoxy group and the number of carbon atoms is counted from the carbon atom bound to said oxygen atom. The content of the group (b) is 80 to 355 millimoles per 100 grams of the nonvolatile matter in the resin composition for cationic electrocoating according to the present invention, provided that the conditions concerning the total content of the group (a), group (b) and group (c) should be satisfied. If said content is lower than 80 millimoles per 100 grams, the impact resistance will be improved only to an unsatisfactory extent. If it is higher than 355 millimoles per 100 grams, the resin composition will become difficult to handle. A preferred content range may be specified according to the resin skeleton. In the case of novolak phenol type epoxy resins and novolak cresol type epoxy resins, for instance, a content of group (b) of 100 to 300 millimoles per 100 grams of the nonvolatile matter in the resin composition is preferred.

The propargyl group as the group (c) can be converted to allene bond, as mentioned above, whereby the reactivity can be improved and a curing system can be built up. For unknown reasons, said group can further improve the throwing power of the resin composition, when coexisting with the sulfonium group (a). The above-mentioned terminal unsaturated double bond-containing organic groups containing 3 to 7 carbon atoms as such can serve as curing functional groups.

The content of the group (c) is 10 to 315 millimoles per 100 grams of the nonvolatile matter in the resin composition for cationic electrocoating according to the present invention, provided that the conditions concerning the total content of the group (a), group (b) and group (c) should be satisfied. If said content is lower than 10 millimoles per 100 grams, the resin composition cannot exhibit sufficient curability even when combined with some other resin and/or a curing agent. If it is higher than 315 millimoles per 100 grams, the impact resistance will be improved only to an unsatisfactory extent. A preferred content range may be specified according to the resin skeleton. In the case of novolak phenol type epoxy resins and novolak cresol type epoxy resins, for instance, a content of group (c) of 20 to 295 millimoles per 100 grams of the nonvolatile matter in the resin composition is preferred.

The total content of the group (a), group (b) and group (c) is not more than 500 millimoles per 100 grams of the nonvolatile matter in the resin composition. If it exceeds 500 millimoles, no resin will be actually obtained or no desired performance characteristics will be obtained in some instances. A preferred total content range can be specified according to the resin skeleton. In the case of novolak phenol type epoxy resins and novolak cresol type epoxy resins, for instance, a total content not more than 400 millimoles is preferred.

A method of producing the resin composition for cationic electrocoating will now be described.

Said resin composition for cationic electrocoating can judiciously be produced, for example, by:

Step (1): reacting an epoxy resin having at least two epoxy groups per molecule with (A) a compound having both a functional group reactive with epoxy group, and propargyl group or a terminal unsaturated double bond-containing organic group containing 3 to 7 carbon atoms, and (B) a compound having both a functional group reactive with epoxy group and an aliphatic hydrocarbon group containing 8 to 24 carbon atoms and optionally containing unsaturated double bond within its chain, to give an epoxy resin composition containing both the propargyl group or the terminal unsaturated double bond-containing organic group containing 3 to 7 carbon atoms, and the aliphatic hydrocarbon group containing 8 to 24 carbon atoms and optionally containing unsaturated double bond within its chain, and;

Step (2): introducing sulfonium group through the epoxy groups which remains in the epoxy resin composition obtained in step (1) and containing both the propargyl group or the terminal unsaturated double bond-containing organic group containing 3 to 7 carbon atoms, and the aliphatic hydrocarbon group containing 8 to 24 carbon atoms and optionally containing unsaturated double bond within its chain.

Suited for use as the epoxy resin having at least two epoxy groups per molecule are, among others, those polyepoxy resins mentioned above. Among these, novolak-phenol type polyepoxy resins, novolak cresol type polyepoxy resins and poly(glycidyl acrylate) are preferred since they can easily be polyfunctionalized for attaining increased curability.

Said epoxy resin having at least two epoxy groups per molecule preferably has a number average molecular weight of 400 to 15,000, more preferably 650 to 12,000.

Said compound having both a functional group reactive with epoxy group, and propargyl group or a terminal unsaturated double bond-containing organic group containing 3 to 7 carbon atoms (hereinafter, "compound (A)") may be, for example, a compound having a functional group reactive with epoxy group, such as hydroxyl or carboxyl group, together with propargyl group or a terminal unsaturated double bond-containing organic group containing 3 to 7 carbon atoms. As specific examples thereof, there may be mentioned compounds having propargyl group and hydroxyl group, such as propargyl alcohol etc.; compounds having propargyl group and carboxyl group, such as propargylic acid etc.; compounds having vinyl group and hydroxyl group, such as 2-hydroxyethyl acrylate, 2-hydroxyethyl methacrylate, hydroxypropyl acrylate, hydroxypropyl methacrylate, hydroxybutyl acrylate, hydroxybutyl methacrylate, allyl alcohol, methallyl alcohol, etc.; and-compounds having vinyl group and carboxyl group, such as acrylic acid, methacrylic acid, ethacrylic acid, etc.

Among these, propargyl alcohol is preferred as the compound having both a functional group reactive with epoxy group, and propargyl group, in view of its ready availability.

The compound having both a functional group reactive with epoxy group and an aliphatic hydrocarbon group containing 8 to 24 carbon atoms and optionally containing unsaturated double bond within its chain (hereinafter, "compound (B)") may be a compound having a functional group reactive with epoxy group, such as hydroxyl or carboxyl group, together with an aliphatic hydrocarbon group containing 8 to 24 carbon atoms and optionally containing unsaturated double bond within its chain. As specific examples of the compound having hydroxyl group and an aliphatic hydrocarbon group, there may be mentioned long-chain aliphatic alcohols such as octanol, nonanol, decyl alcohol, undecanol, dodecanol, tridecanol, tetradecanol, pentadecanol, hexadecanol, heptadecanol, octadecanol, nonadecanol, eicosanol, docosanol, 2-propyl-1-pentanol, 2,4,4-trimethyl-1-pentanol, 2-ethyl-1-hexanol, 3,3,5-trimethyl-1-hexanol, 3,7-dimethyl-1-octanol, 2-octanol, 3-octanol, 2-nonanol, 2-decanol, 4-decanol, 2-undecanol, 2-dodecanol, 2-tetradecanol, 2-hexadecanol, 6-methyl-2-heptanol, 4-methyl-3-heptanol, 2,6-dimethyl-4-heptanol, 3-ethyl-2,2-dimethyl-3-pentanol, 3,7-dimethyl-3-octanol, etc.; and unsaturated double bond-containing long-chain aliphatic alcohols such as 1-octen-3-ol, β-citronellol, 3-nonen-1-ol, 5-decen-1-ol, 9-decen-1-ol, ω-undecylenyl alcohol, 7-dodecen-1-ol, 7-tetradecen-1-ol, 9-tetradecen-1-ol, 11-tetradecen-1-ol, 11-hexadecen-1-ol, oleyl alcohol, 2,4-dimethyl-2,6-heptadien-1-ol, phytol, nerol, geraniol, 8,10-dodecadien-1-ol, farnesol, 6-methyl-5-hepten-2-ol, etc.

As the compound having carboxyl group and an aliphatic hydrocarbon group, there may be mentioned, for example, long-chain fatty acids such as octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, eicosanoic acid, heneicosanoic acid, docosanoic acid, tricosanoic acid, tetracosanoic acid, etc.; and synthetic or natural unsaturated fatty acids such as 2-ethylhexenoic acid, 2-octanoic acid, citronellic acid, undecylenic acid, myristoleic acid, palmitoleic acid, oleic acid, linolic acid, ricinolic acid, elaidic acid, 11-eicosenoic acid, erucic acid, nervonic acid, linolenic acid, 11,14-eicosatrienoic acid, arachidonic acid, 5,8,11,14,17-eicosapentaenoic acid, 4,7,10,13,16,19-docosahexaenoic acid, 2-propylpentanoic acid, 2-ethylhexanoic acid, linseed oil, soybean oil, etc.

As the compound (B), carboxyl group-containing ones are preferred and unsaturated fatty acids are more preferred from the reactivity viewpoint.

In the above-mentioned step (1), the epoxy resin having at least two epoxy groups per molecule is subjected to react with the above-mentioned compound (A) and compound (B) to give the desired epoxy resin composition. On that occasion, the compound (A) and compound (B) may be mixed together in advance and submitted to reaction, or the compound (A) and compound (B) may be submitted to reaction separately. The functional group of the compound (A) which is reactive with epoxy group and the functional group of the compound (B) which is reactive with epoxy group may be the same or different.

In step (1), the proportions of the compound (A) and compound (B) to be submitted to reaction may be determined so as to give desired functional group contents, for instance to give the above-mentioned contents of the propargyl group or the terminal unsaturated double bond-containing organic group containing 3 to 7 carbon atoms, and that of the aliphatic hydrocarbon group containing 8 to 24 carbon atoms and optionally containing unsaturated double bond within its chain.

As for the reaction conditions in step (1), the reaction is generally carried out at room temperature or a temperature of 80 to 140° C. for several hours. If necessary, one or more known components, such as a catalyst and/or a solvent, may be used to allow the reaction to proceed. The end point of the reaction can be confirmed by determining the epoxy equivalent, and the functional groups introduced can be identified by nonvolatile matter determination or instrumental analysis of the resin composition obtained. Generally, the thus-obtained reaction product is a mixture of epoxy resin species containing one or some of the propargyl group and/or the terminal unsaturated double bond-containing organic group containing 3 to 7 carbon atoms and the aliphatic hydrocarbon group containing 8 to 24 carbon atoms and optionally containing unsaturated double bond within its chain. In this meaning, step (1) gives a resin composition containing the propargyl group and/or the terminal unsaturated double bond-containing organic group containing 3 to 7 carbon atoms, and the aliphatic hydrocarbon group containing 8 to 24 carbon atoms and optionally containing unsaturated double bond within its chain.

In step (2), sulfonium groups are introduced into the resin through the epoxy groups remaining in the epoxy resin composition obtained in step (1). The sulfonium introduction can be carried out, for example, by subjecting a sulfide/acid mixture to react with epoxy group in said resin for sulfide introduction and sulfonium conversion, or by introducing a sulfide and then converting this sulfide to a sulfonium by reaction with an acid or an alkyl halide such as methyl fluoride, methyl chloride or methyl bromide, if necessary followed by anion exchange. From the viewpoint of ready availability of reactants, the method using a sulfide/acid mixture is preferred.

Said sulfide is not particularly restricted but can include, among others, aliphatic sulfides, aliphatic-aromatic mixed sulfides, aralkyl sulfides and cyclic sulfides. More specifically, there may be mentioned, for example, diethyl sulfide, dipropyl sulfide, dibutyl sulfide, dihexyl sulfide, diphenyl sulfide, ethyl phenyl sulfide, tetramethylene sulfide, pentamethylene sulfide, thiodiethanol, thiodipropanol, thiodibutanol, 1-(2-hydroxyethylthio)-2-propanol, 1-(2-hydroxyethylthio)-2-butanol, 1-(2-hydroxyethylthio)-3-butoxy-1-propnol and the like.

The acid mentioned above is not particularly restricted but can include, for example, formic acid, acetic acid, lactic acid, propionic acid, boric acid, butyric acid, dimethylolpropionic acid, hydrochloric acid, sulfuric acid, phosphoric acid, N-acetylglycine, N-acetyl-β-alanine and the like.

Generally preferred as the proportions of the sulfide and acid in said sulfide/acid mixture are approximately sulfide/acid =100/60 to 100/100 on the mole basis.

The reaction in step (2) can be carried out, for example, by mixing the epoxy resin composition obtained in step (1) and the sulfide/acid mixture, for instance, in an amount sufficient to give the sulfonium group content specified above, with 5 to 10 moles, per mole of the sulfide, of water and then stirring generally at 50 to 90° C. for several hours. The end point of the reaction can advisably be judged by a residual acid value of not more than 5. The sulfonium introduction in the resin composition obtained can be confirmed by potentiometric titration.

In cases where sulfide introduction is followed by conversion reaction of the sulfide to sulfonium group, the reaction can be carried out essentially under the same conditions as mentioned above.

In the production method of the present invention, the decomposition of the sulfonium group upon heating can be avoided by carrying out the sulfonium introduction after the propargyl introduction, as mentioned above.

Thus, the production method of the present invention can give a resin composition for cationic electrocoating which has a skeleton of epoxy resin and contains (a) sulfonium group, (b) an aliphatic hydrocarbon group containing 8 to 24 carbon atoms and optionally containing unsaturated double bond within its chain, and (c) at least one member selected from among propargyl group and a terminal unsaturated double bond-containing organic group containing 3 to 7 carbon atoms, while preventing the sulfonium group from being degraded.

The cationic electrocoating composition of the present invention comprises the above-mentioned resin composition for cationic electrocoating as incorporated therein. Said resin composition for cationic electrocoating may be used as the basic resin or in combination with some other basic resin. In cases where said resin composition for cationic electrocoating is used as the basic resin, the content of the curing functional groups is preferably 10 to 495 millimoles per 100 grams of the nonvolatile matter in the resin composition. In cases where the aliphatic hydrocarbon group containing 8 to 24 carbon atoms and optionally containing unsaturated double bond within its chain has unsaturated double bond, it suffices that the total content of said unsaturated double bond and the propargyl group and/or the terminal unsaturated double bond-containing organic group containing 3 to 7 carbon atoms be within the range mentioned above. Even when a plurality of unsaturated double bonds are contained in one aliphatic hydrocarbon group, it is presumable that only one of them alone be actually involved in the curing reaction; therefore, in calculating the content thereof, such plurality of unsaturated double bonds are regarded as one unsaturated double bond.

The propargyl group content is preferably not less than 20 millimoles, more preferably not less than 40 millimoles, per 100 grams of the nonvolatile matter in the resin composition, in cases where the resin composition for cationic electrocoating is used as the basic resin. If the propargyl group content is lower than 20 millimoles, the throwing power and/or curability may possibly become insufficient or the bath stability may become poor. However, even when the propargyl group content is lower than 20 millimoles per 100 grams of the nonvolatile matter, the resin composition for cationic electrocoating of the invention can suitably be used in combination with some other basic resin, for producing cationic electrocoating compositions, as mentioned in the following.

In cases where the resin composition for cationic electrocoating according to the present invention is used in combination with some other basic resin, it is preferable to use, as said other basic resin, a resin composition having a skeleton of epoxy resin and containing sulfonium group and propargyl group. As such resin composition, there may be mentioned, among others, resin compositions having a skeleton of epoxy resin and a number average molecular weight of 500 to 20,000 and containing 5 to 400 millimoles of sulfonium group and 10 to 495 millimoles of propargyl group per 100 grams of the nonvolatile matter in the resin composition, with a total content of the sulfonium and propargyl groups of not more than 500 millimoles per 100 grams of the nonvolatile matter in the resin composition.

In that case, the proportions of the resin composition for cationic electrocoating of the invention to said other basic resin are preferably determined to satisfy the following:

said cationic electrocoating composition prepared by incorporating them has a number average molecular weight of its resin component of 500 to 20,000 and contains, per 100 grams of the resin solids, (a) 5 to 400 millimoles of the sulfonium group;

(b) 10 to 300 millimoles of the aliphatic hydrocarbon group containing 8 to 24 carbon atoms and optionally containing unsaturated double bond within its chain; and 10 to 485 millimoles of the sum of propargyl group and the terminal unsaturated double bond-containing organic group containing 3 to 7 carbon atoms: and the total content of (a) the sulfonium group, (b) the aliphatic hydrocarbon group containing 8 to 24 carbon atoms and optionally containing unsaturated double bond within its chain, and the propargyl group and the terminal unsaturated double bond-containing organic group containing 3 to 7 carbon atoms is not more than 500 millimoles per 100 grams of the resin solids, with the proportion of the group (b) being 3 to 30% by weight relative to the resin solids.

It is not always necessary to use a curing agent in the cationic electrocoating composition of the present invention since the resin composition for cationic electrocoating itself has curability. However, for attaining a further improvement in curability, a curing agent may be used. As such curing agent, there may be mentioned, for instance, compounds having a plurality of at least one species of propargyl group and unsaturated double bond, such as compounds obtained by addition reaction of a propargyl-containing compound, such as propargyl alcohol, or an unsaturated double bond-containing compound such as acrylic acid, to a novolak phenol polyepoxide, pentaerythritol tetraglycidyl ether or the like.

In the cationic electrocoating composition of the present invention, a curing catalyst may be used if desired. Said curing catalyst is not particularly restricted but can include, for example, transition metals, such as nickel, cobalt, copper, manganese, palladium and rhodium, with a ligand such as cyclopentadiene or acetylacetone or a carboxylic acid such as acetic acid bound thereto. Among these, copper acetylacetone complex and copper acetate are preferred. The use of compounds of a transition metal such as copper, silver or barium, which can form acetylides, for example acetylacetone-copper, is preferred from the curability viewpoint, since they can form acetylides with the propargyl group. The level of incorporation of said curing catalyst is preferably 0.1 to 20 millimoles per 100 grams of the resin solids in the cationic electrocoating composition.

An amine may be also incorporated in the cationic electrocoating composition of the present invention. The addition of the amine brings about an increased conversion of the sulfonium group to a sulfide by electrolytic reduction during the electrocoating process. Said amine is not particularly restricted but can include, for example, primary to tertiary monofunctional to polyfunctional aliphatic amines, alicyclic amines, aromatic amines and like amine compounds. Among them, water-soluble or water-dispersible ones are preferred, for example alkylamines containing 2 to 8 carbon atoms, such as monomethylamine, dimethylamine, trimethylamine, triethylamine, propylamine, diisopropylamine, tributylamine, etc.; monoethanolamine, diethanolamine, methylethanolamine, dimethylethanolamine, cyclohexylamine, morpholine, N-methylmorpholine, pyridine, pyrazine, piperidine, imidazoline, imidazole, etc. These may be used singly or two or more of them may be used in combination. Hydroxyamines such as monoethanolamine, diethanolamine and dimethylethanolamine are preferred among others because of their good aqueous dispersion stability.

Said amine can be incorporated directly in the cationic electrocoating composition of the present invention. In the case of conventional neutralization type amine-containing cationic electrocoating compositions, the addition of a free amine deprives the neutralizing acid in the resin, whereby the stability of the electrolyte bath is markedly worsened. To the contrary, no such bath stability disturbance is encountered according to the invention.

The level of said amine added is preferably 0.3 to 25 milliequivalents per 100 grams of the resin solids in the cationic electrocoating composition. When it is below 0.3 milliequivalents per 100 grams, any sufficient effect cannot be produced on the throwing power. The addition at a level above 25 milliequivalents per 100 grams is uneconomical, since an enhanced effect proportional to the high addition level cannot be expected. A more preferred range is 1 to 15 milliequivalents per 100 grams.

The cationic electrocoating composition of the present invention may contain, when necessary, one or more other ingredients used in ordinary cationic electrocoating compositions. Said other ingredients are not particularly restricted but include, for example, pigments, pigment dispersing resins, surfactants, antioxidants, ultraviolet absorbers and other coating additives.

Said pigments are not particularly restricted but include, for example, color pigments such as titanium dioxide, carbon black, iron oxide red, etc.; rust preventing pigments such as basic lead silicate, aluminum phosphomolybdate, etc.; extenders such as kaolin, clay, talc, etc.: and other pigments in general use in cationic electrocoating compositions.

The level of said pigments added is preferably 0 to 50% by weight relative to the nonvolatile matter in the cationic electrocoating composition.

Said pigment dispersing resins are not particularly restricted, but those pigment dispersing resins which are in general use can be used. Pigment dispersing resins containing sulfonium group and unsaturated bond therein may also be used. Such pigment dispersing resins containing sulfonium group and unsaturated bond can be obtained, for example, by reacting a sulfide compound with a hydrophobic epoxy resin obtained by reacting a bisphenol type epoxy resin with a half blocked isocyanate, or by reacting a sulfide compound with said resin in the presence of a monobasic acid and a hydroxyl-containing dibasic acid.

The cationic electrocoating composition of the present invention can be prepared by blending said resin composition for cationic electrocoating with the above-mentioned ingredients as necessary, followed by dissolution or dispersion in water. In using cationic electrocoating, said composition is preferably prepared so that the nonvolatile matter may amount to 10 to 30% of the bath liquid. Further, it is preferably prepared so that the content of the propargyl group, the terminal unsaturated double bond-containing organic group containing 3 to 7 carbon atoms, the aliphatic hydrocarbon group containing 8 to 24 carbon atoms and optionally containing unsaturated double bond within its chain, and the sulfonium group may not deviate from the respective ranges mentioned above.

In carrying out electrocoating using the cationic electrocoating composition of the present invention, the substrate is not particularly restricted provided that it is electroconductive. As the substrate, there may be mentioned, for example, iron sheets, steel sheets and aluminum sheets, with or without surface treatment, and shaped articles derived therefrom.

The electrocoating is generally carried out by applying a voltage of 50 to 450 V between the substrate as a cathode and an anode. When the voltage applied is less than 50 V, the electrodeposition will proceed insufficiently. When it is above 450 V, the electric power consumption will become uneconomically excessive. By using the composition of the present invention and applying an voltage in the range mentioned above, a uniform coating can be formed all over the substrate surface without any abrupt increase in film thickness during the electrodeposition process.

It is generally preferred that the temperature of the bath comprising the cationic electrocoating composition when the above voltage is applied be preferably 10 to 45° C.

The electrodeposition process preferably comprises: (i) a step of immersing the substrate in the cationic electrocoating composition, (ii) a step of applying a voltage between the substrate as a cathode and an anode to thereby cause a coating to deposit and (iii) a step of further applying a voltage to said coating to thereby increasing the electric resistance per unit volume of the coating. The period of voltage application may vary depending on the electrodeposition conditions but, generally, it may be 2 to 4 minutes.

After completion of the electrodeposition process, the electrocoatings obtained in the above manner, either as such or after washing with water, are baked for curing at 120 to 260° C., preferably 160 to 220° C., for 10 to 30 minutes to complete the coating process.

When the cationic electrocoating composition of the present invention is used, the electrocoatings after curing preferably have a thickness of 10 to 25 $\mu$m. If it is less than 10 $\mu$m, the rust inhibiting effect will be insufficient. If it exceeds 25 $\mu$m, the coating composition will be wasted. With the cationic electrocoating composition of the present invention, the coatings formed on substrate surfaces by electrodeposition are converted to nonconductors by the electrolytic reduction reaction mentioned above, resulting in a great improvement in throwing power. Therefore, even when the film thickness is within the above range, uniform coatings can be formed all over the substrates and thus a satisfactory corrosion resistance effect can be produced.

The thus-coated substrates are further provided with a necessary intermediate coat and/or a top coat according to the intended use. In the case of automotive coatings, for instance, a solvent- or water-base or powder intermediate coating composition is generally applied and baked to provide chipping resistance and, furthermore, the two-coat one-bake coating method is applied which comprises the so-called wet-on-wet coating technique of applying a base coating composition and, without curing this, applying a clear coating composition, followed by baking the resulting coatings simultaneously. On that occasion, it is preferred, from the environment protection viewpoint, that a water-base coating composition be used as said base coating composition and a powder coating composition be used as said clear coating composition. In addition to this, it is of course possible to apply a solid type coating composition using the one-coat coating technique.

BEST MODES FOR CARRYING OUT THE INVENTION

The following examples illustrate the present invention in further detail. They are, however, by no means limitative of the scope of the present invention.

PRODUCTION EXAMPLE 1

Production of a Sulfonium-, Propargyl- and Copper Acetylide-Containing Resin Composition For Cationic Electrocoating A separable flask equipped with a stirrer, thermometer, nitrogen inlet tube and reflux condenser was charged with 100.0 g of a cresol novolak type epoxy resin with an epoxy equivalent of 200.4 (Epototo YDCN-701 (trademark), product of Toto Kasei), 23.6 g of propargyl alcohol and 0.3 g of dimethylbenzylamine, the temperature was raised to 105° C., and the reaction was carried out for 3 hours to give a propargyl-containing resin composition with an epoxy equivalent of 1,580. Thereto was added 2.5 g of copper acetylacetonate, and the reaction was carried out at 90° C. for 1.5 hours. It was confirmed by proton (1H) NMR that the terminal hydrogen of the propargyl group added had disappeared in part (corresponding to 14 millimoles per 100 grams of the nonvolatile matter in the resin composition). To this was added 10.6 g of 1-(2-hydroxyethylthio)-2,3-propanediol, 4.7 g of glacial acetic acid and 7.0 g of deionized water, and the reaction was carried out for 6 hours while maintaining the temperature at 75° C. and, after confirming that the residual acid value was less than 5, 43.8 g of deionized water was added to give the desired resin composition solution. This was a varnish having a solids content of 70.0% by weight and a sulfonium value of 28.0 millimoles per 100 grams. The number average molecular weight (polystyrene equivalent as determined by GPC) was 2,433.

PRODUCTION EXAMPLE 2
Production of a Sulfonium-, Propargyl- and Long-Chain Unsaturated fatty Acid Residue-Containing Resin Composition For Cationic Electrocoating A separable flask equipped with a stirrer, thermometer, nitrogen inlet tube and reflux condenser was charged with 100.0 g of a cresol novolak type epoxy resin with an epoxy equivalent of 200.4 (Epototo YDCN-701 (trademark), product of Toto Kasei), 13.5 g of propargyl alcohol and 0.2 g of dimethylbenzylamine, the temperature was raised to 105° C., and the reaction was carried out for 1 hour to give a propargyl-containing resin composition with an epoxy equivalent of 445. Thereto was added 50.6 g of linolic acid and an additional 0.1 g of dimethylbenzylamine, and the reaction was continued at the same temperature for 3 hours, to give a propargyl- and long-chain unsaturated fatty acid residue-containing resin composition with an epoxy equivalent of 2,100. Thereto was added 10.6 g of 1-(2-hydroxyethylthio)-2,3-propanediol, 4.7 g of glacial acetic acid and 7.0 g of deionized water, and the reaction was carried out for 6 hours while maintaining the temperature at 75° C. and, after confirming that the residual acid value was less than 5, 62.9 g of deionized water was added to give the desired resin composition solution. This was a varnish having a solids content of 69.3% by weight and a sulfonium value of 23.5 millimoles per 100 grams. The number average molecular weight (polystyrene equivalent as determined by GPC) was 3,106.

PRODUCTION EXAMPLE 3
Production of a Sulfonium-, Propargyl- and Vinyl-Containing Resin Composition For Cationic Electrocoating A separable flask equipped with a stirrer, thermometer, nitrogen inlet tube and reflux condenser was charged with 100.0 g of a cresol novolak type epoxy resin with an epoxy equivalent of 200.4 (Epototo YDCN-701 (trademark), product of Toto Kasei), 13.5 g of propargyl alcohol, 10.5 g of allyl alcohol, 0.05 g of hydroquinone and 0.3 g of dimethylbenzylamine, the temperature was raised to 105° C., and the reaction was carried out for 3 hours to give a propargyl- and vinyl-containing resin composition with an epoxy equivalent of 1,590. Thereto was added 10.6 g of 1-(2-hydroxyethylthio)-2,3-propanediol, 4.7 g of glacial acetic acid and 7.0 g of deionized water, and the reaction was carried out for 6 hours while maintaining the temperature at 75° C. and, after confirming that the residual acid value was less than 5, 45 g of deionized water was added to give the desired resin solution. This was a varnish having a solids content of 70.9% by weight and a sulfonium value of 27.6 millimoles per 100 grams. The number average molecular weight (polystyrene equivalent as determined by GPC) was 2,439.

PRODUCTION EXAMPLE 4
Production of a Sulfonium-, Propargyl- and Long-Chain Saturated Fatty Acid Residue-Containing Resin Composition For Cationic Electrocoating A separable flask equipped with a stirrer, thermometer, nitrogen inlet tube and reflux condenser was charged with 100.0 g of a cresol novolak type epoxy resin with an epoxy equivalent of 200.4 (Epototo YDCN-701 (trademark), product of Toto Kasei), 5.1 g of propargyl alcohol and 0.1 g of dimethylbenzylamine, the temperature was raised to 105° C., and the reaction was carried out for 1 hour to give a propargyl-containing resin composition with an epoxy equivalent of 260. Thereto was added 94.1 g of stearic acid and an additional 0.2 g of dimethylbenzylamine, and the reaction was continued at the same temperature for 4 hours, to give a propargyl- and long-chain saturated fatty acid residue-containing resin with an epoxy equivalent of 2,550. Thereto was added 10.6 g of 1-(2-hydroxyethylthio)-2,3-propanediol, 4.7 g of glacial acetic acid and 7.0 g of deionized water, and the reaction was carried out for 6 hours while maintaining the temperature at 75° C. and, after confirming that the residual acid value was less than 5, 78.1 g of deionized water was added to give the desired resin composition solution. This was a varnish having a solids content of 70.1% by weight and a sulfonium value of 19.6 millimoles per 100 grams. The number average molecular weight (polystyrene equivalent as determined by GPC) was 3,689.

EXAMPLE 1

Deionized water (156.8 g) was added to 100.0 g of the sulfonium-, propargyl- and copper acetylide-containing resin composition for cationic electrocoating as obtained in Production Example 1 and 43.2 g of the sulfonium-, propargyl- and long-chain unsaturated fatty acid residue-containing resin composition for cationic electrocoating as obtained in Production Example 2, the mixture was stirred in a high-speed rotary mixer for 1 hour and, then, 373.3 g of deionized water was further added to give an aqueous solution having a solids concentration of 15% by weight. This was used as a cationic electrocoating composition.

EXAMPLE 2

Nickel acetylacetonate (1.0 g) and 157.7 g of deionized water were added to 119.9 g of the sulfonium-, propargyl- and vinyl-containing resin composition for cationic electrocoating as obtained in Production Example 3 and 21.4 g of the sulfonium-, propargyl- and long-chain saturated fatty acid residue-containing resin composition for cationic electrocoating as obtained in Production Example 4, the mixture was stirred in a high-speed rotary mixer for 1 hour and, then, 373.3 g of deionized water was further added to give an aqueous solution having a solids concentration of 15% by weight, which was used as a cationic electrocoating composition.

Comparative Example 1

Deionized water (157.1 g) was added to 142.9 g of the sulfonium-, propargyl- and copper acetylide-containing resin composition for cationic electrocoating as obtained in Production Example 1, the mixture was stirred in a high-speed rotary mixer for 1 hour and, then, 373.3 g of deionized water -was further added to give an aqueous solution having a solids concentration of 15% by weight, which was used as a cationic electrocoating composition.

Comparative Example 2

Nickel acetylacetonate (1.0 g) and 158.0 g of deionized water were added to 141.0 g of the sulfonium-, propargyland vinyl-containing resin composition for cationic electrocoating as obtained in Production Example 3, the mixture was stirred in a high-speed rotary mixer for 1 hour and, then, 373.3 g of deionized water was further added to give an aqueous solution having a solids concentration of 15% by weight, which was used as a cationic electrocoating composition.

Evaluation

Using a zinc phosphate-treated cold-rolled steel sheet (JIS G 3141 SPCC-SD, treated with Surfdine SD-5000 (trademark, product of Nippon Paint)) as the cathode and a stainless steel container as the anode, electrocoating was carried out with one of the cationic electrocoating compositions obtained in the examples and comparative examples. The substrate was taken out of the electrolyte bath, washed with water and baked at 160° C. for 20 minutes to give an electrodeposition coat. To the thus-obtained coat was applied with a solvent-base intermediate coating composition (of the melamine curing alkyd resin type) to a dry film thickness of 40 μm using an air spray, the whole was placed in a baking/drying oven maintained at 140° C. and baking was conducted for 30 minutes. Then, a solvent-base metallic coating composition (of the melamine curing acrylic type) was applied to a dry film thickness of 15 μm using an air spray. Thereafter, a solvent-base clear coating composition (of the melamine curing acrylic type) was applied to a dry film thickness of 40 μm by electrostatic spray coating. The coated substrate was placed in a baking/drying oven maintained at 140° C. and baking was conducted for 30 minutes to give a test specimen.

(1) Chipping Resistance Test

Each test specimen thus obtained was set on a gravelometer tester so that crushed stones might strike against the test specimen at an angle of 45° and the chipping resistance test was carried out under the following conditions:

| Crushed stones: | No. 7; |
| Amount of crushed stones: | 50 grams; |
| Ejection pressure: | 4 kg/cm²; |
| Test specimen temperature: | 25° C., −20° C. |

After completion of the test, an adhesive cellophane tape was applied to the destructed coating and then peeled off. The state of the coating on the test specimen after peeling was evaluated by the eye according to the following criteria. The results thus obtained are shown in Table 1.

O: No peeling around the destructed site of coating;

X: Slight peeling around the destructed site of coating;

XX: Marked peeling around the destructed site of coating.

(2) Throwing Power

Figure 1:
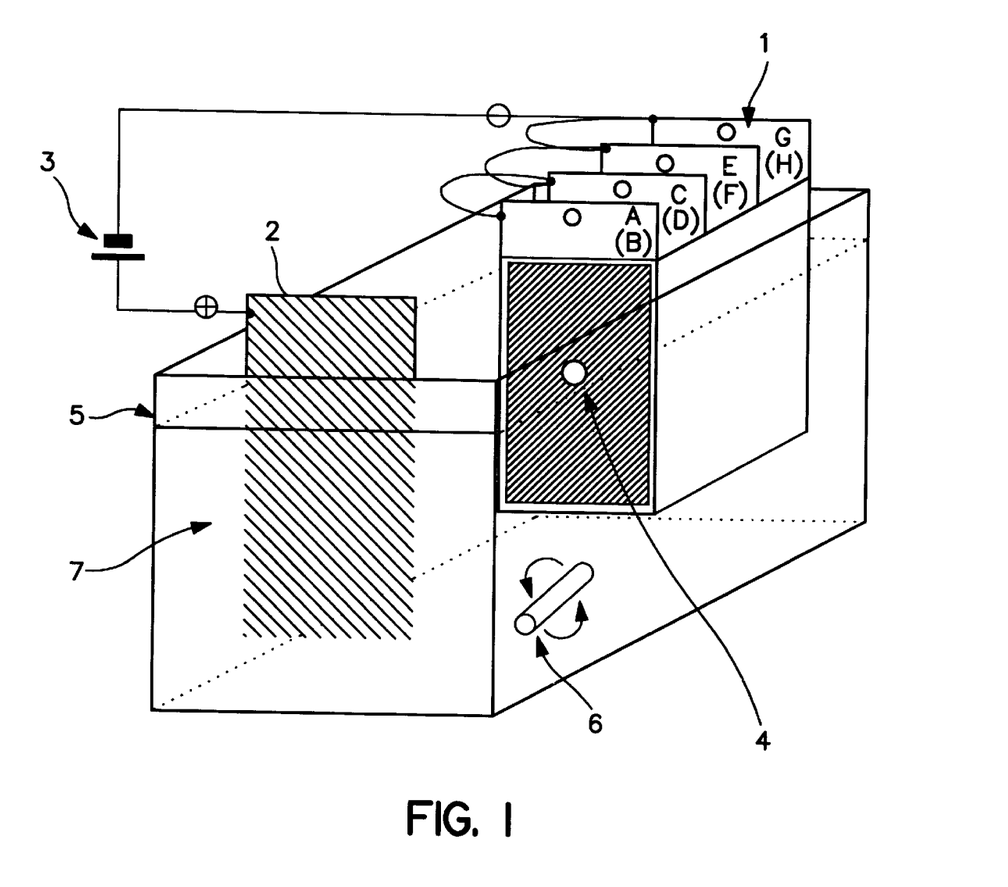

Using the four sheet box method illustrated in FIG. 1, the film thickness ratio between face G and face A, namely the G/A value (%), was determined. The results obtained are shown in Table 1. From the results shown in Table 1, it was revealed that the throwing power was always above 85% when the cationic electrocoating compositions obtained in the examples were used, indicating a marked improvement as compared with the conventional formic acid-neutralized electrocoating compositions.

TABLE 1

| | State of peeling following chipping | | Throwing power |
| --- | --- | --- | --- |
| | 25° C. | −20° C. | G/A (%) |
| Example 1 | O | O | 88.8 |
| Example 2 | | | |
| Comparative Example 1 | X | XX | 94.1 |
| Comparative Example 2 | X | XX | 89.3 |

EFFECTS OF THE INVENTION

The resin composition for cationic electrocoating according to the present invention, which has the constitution mentioned above, can realize a high level of throwing power and form coatings excellent in impact resistance. The cationic electrocoating composition of the present invention can exhibit a high level of throwing power and, even when an amine is used, it can show high bath stability, and can produce cured coatings having excellent physical properties. By applying the two-coat one-bake technique, it is possible to realize coatings excellent in anti-corrosion effect and impact resistance using said composition.

What is claimed is:

1. An aliphatic hydrocarbon group-containing resin composition for cationic electrocoating, which comprises a resin having a skeleton of epoxy resin and has a number average molecular weight of 500 to 20,000, and which contains, per 100 grams of the nonvolatile matter in said resin composition, (a) 5 to 400 millimoles of sulfonium group;

(b) 80 to 355 millimoles of at least one aliphatic hydrocarbon group containing 8 to 24 carbon atoms and optionally containing unsaturated double bond within its chain; and (c) 10 to 315 millimoles of at least one member selected from among propargyl group and a terminal unsaturated double bond-containing organic group containing 3 to 7 carbon atoms;

the total content of (a) the sulfonium group, (b) the aliphatic hydrocarbon group containing 8 to 24 carbon atoms and optionally containing unsaturated double bond within its chain and (c) the at least one member selected from among propargyl group and a terminal unsaturated double bond-containing organic group containing 3 to 7 carbon atoms being not more than 500 millimoles per 100 grams of the nonvolatile matter in said resin composition.

2. The resin composition for cationic electrocoating as claimed in claim 1, wherein the epoxy resin is of the novolak phenol type or novolak cresol type, and which has a number average molecular weight of 700 to 5,000 and contains, per 100 grams of the nonvolatile matter in said resin composition, (a) 5 to 250 millimoles of sulfonium group;

(b) 100 to 300 millimoles of at least one aliphatic hydrocarbon group containing 8 to 24 carbon atoms and optionally containing unsaturated double bond within its chain; and (c) 20 to 295 millimoles of at least one member selected from among propargyl group and a terminal unsaturated double bond-containing organic group containing 3 to 7 carbon atoms;

the total content of said groups (a), (b) and (c) being not more than 400 millimoles per 100 grams of the non-volatile matter in said resin composition.

3. A cationic electrocoating composition which comprises the resin composition for cationic electrocoating as claimed in claim 1 as incorporated therein.

4. The cationic electrocoating composition as claims in claim 3 which further comprises a resin composition having a skeleton of epoxy resin and containing sulfonium group and propargyl group, wherein said cationic electrocoating composition have a number average molecular weight of its resin component of 500 to 20,000 and contains, per 100 grams of the resin solids, (a) 5 to 400 millimoles of the sulfonium group;

(b) 10 to 300 millimoles of the aliphatic hydrocarbon group containing 8 to 24 carbon atoms and optionally containing unsaturated double bond within its chain; and 10 to 485 millimoles of the sum of propargyl group and the terminal unsaturated double bond-containing organic group containing 3 to 7 carbon atoms;

the total content of (a) the sulfonium group, (b) the aliphatic hydrocarbon group containing 8 to 24 carbon atoms and optionally containing unsaturated double bond within its chain, and the propargyl group and the terminal unsaturated double bond-containing organic group containing 3 to 7 carbon atoms being not more than 500 millimoles per 100 grams of the resin solids, with the proportion of said group (b) being 3 to 30% by weight relative to the resin solids.

5. A cationic electrocoating composition which comprises the resin composition for cationic electrocoating as claimed in claim 2 as incorporated therein.

* * * * *